United States Patent [19]

Kumar et al.

[11] Patent Number: 6,147,678

[45] Date of Patent: Nov. 14, 2000

[54] VIDEO HAND IMAGE-THREE-DIMENSIONAL COMPUTER INTERFACE WITH MULTIPLE DEGREES OF FREEDOM

[75] Inventors: Sentihil Kumar, Aberdeen; Jakub Segen, Fair haven, both of N.J.

[73] Assignee: Lucent Technologies Inc., Murray Hill, N.J.

[21] Appl. No.: 09/208,196

[22] Filed: Dec. 9, 1998

[51] Int. Cl.$^7$ ........................................ G09G 5/08
[52] U.S. Cl. .......................... 345/158; 345/156; 345/358
[58] Field of Search ............................ 382/48, 168, 288; 395/155; 345/156, 168, 158; 364/188

[56] References Cited

U.S. PATENT DOCUMENTS

| | | | |
|---|---|---|---|
| 5,168,531 | 12/1992 | Sigel | 382/48 |
| 5,319,747 | 6/1994 | Gerrissen et al. | 395/155 |
| 5,381,158 | 1/1995 | Takahara et al. | 345/156 |
| 5,454,043 | 9/1995 | Freeman | 382/168 |
| 5,617,312 | 4/1997 | Iura et al. | 364/188 |
| 5,767,842 | 6/1998 | Korth | 345/168 |
| 6,002,808 | 12/1999 | Freeman | 382/288 |
| 6,043,805 | 3/2000 | Hsich | 345/158 |

Primary Examiner—Steven J. Saras
Assistant Examiner—Srilakshmi Kumar

[57] ABSTRACT

A video gesture-based three-dimensional computer interface system that uses images of hand gestures to control a computer and that tracks motion of the user's hand or a portion thereof in a three-dimensional coordinate system with ten degrees of freedom. The system includes a computer with image processing capabilities and at least two cameras connected to the computer. During operation of the system, hand images from the cameras are continually converted to a digital format and input to the computer for processing. The results of the processing and attempted recognition of each image are then sent to an application or the like executed by the computer for performing various functions or operations. When the computer recognizes a hand gesture as a "point" gesture with one or two extended fingers, the computer uses information derived from the images to track three-dimensional coordinates of each extended finger of the user's hand with five degrees of freedom. The computer utilizes two-dimensional images obtained by each camera to derive three-dimensional position (in an x, y, z coordinate system) and orientation (azimuth and elevation angles) coordinates of each extended finger.

9 Claims, 5 Drawing Sheets

VIDEO HAND IMAGE-THREE-DIMENSIONAL COMPUTER INTERFACE WITH MULTIPLE DEGREES OF FREEDOM

BACKGROUND OF THE INVENTION

I. Field of the Invention

This invention pertains to a method and apparatus for inputting commands to a computer using hand signals. More particularly, the present invention relates to a video gesture-based computer interface wherein images of hand gestures are used to control a computer and wherein motion of the user's hand or a portion thereof is tracked in a three-dimensional coordinate system with ten degrees of freedom.

II. Description of the Related Art

Various types of computer control and interface devices exist for inputting commands to a computer. Such devices may for example take the form of a computer mouse, joystick or trackball, wherein a user manipulates the interface device to perform a particular operation such as to select a specific entry from a menu of options, perform a "click" or "point" function, etc. A significant problem associated with such interface devices is that a surface area is needed for placement of the device and, in the case of a mouse, to accommodate device movement and manipulation. In addition, such interface devices are generally connected by a cable to a computer CPU with the cable typically draped across the user's desk, causing obstruction of the user's work area. Moreover, because interface device manipulation for performing operations is not consistent with common communication movements, such as the use of a pointing finger hand gesture to select a menu entry, as opposed to maneuvering a mouse until the cursor rests on the desired menu entry, a user must become comfortable and familiar with the operation of the particular interface device before proficiency in use may be attained.

To address these drawbacks, a video interface system for enabling a user to utilize hand gestures to issue commands to a computer has been developed and is described in the commonly assigned U.S. patent application entitled "Video Hand Image Computer Interface", Ser. No. 08/887,765 of Segen, filed Jul. 3, 1997 (hereinafter "Segen"), which is hereby incorporated herein by reference in its entirety. The Segen system, by way of preferred example, utilizes a video camera or other video input device connected to an image processing computer, with the camera positioned to receive images of an object such as a user's hand. The image processing capabilities of the computer act upon predetermined recognized hand gestures as computer commands. Hand images from the camera are converted to a digital format and input to the computer for processing. The results of the processing and attempted recognition of each image are sent to an application or the like for performing various functions or operations.

However, the use of both traditional two-dimensional input devices and the Segen system is problematic in advanced computer-based three-dimensional object selection and manipulation applications. In such applications, a virtual three-dimensional environment is typically displayed to the user with one or more displayed virtual objects and command menus positioned within the virtual environment. The user may delete, move and otherwise change the objects in the virtual environment or create new objects. The user may also select various commands from the command menus. Other functions may be performed in the virtual environment such, for example as, drawing curves. Traditional input devices are extremely difficult to use in such a virtual environment because traditional devices control only two degrees of freedom, and thus a combination of several input devices is required to control three or more degrees of freedom as is necessary in three-dimensional applications. Such a combination control scheme is cumbersome, unintuitive and requires significant training on the user's part. The Segen system provides for three degrees of freedom, which is more than adequate for issuing commands, but not sufficient for use in some three-dimensional applications where interaction with three-dimensional objects is necessary. Advanced three-dimensional applications that utilize a virtual world environment displayed to the user require more degrees of freedom. In particular, an application may require the user to grasp, move, and otherwise manipulate three-dimensional virtual objects displayed to the user in the virtual world environment. To accomplish such complex tasks in a natural way, at least two of the user's fingers, such as the index finger and the thumb, must be independently tracked with five degrees of freedom for each finger.

It would thus be desirable to provide a computer interface that enables common and intuitive hand gestures and hand motions to be used for interacting with a three-dimensional virtual environment. It would further be desirable to provide a system and method for tracking hand gestures and hand motions in a three-dimensional coordinate system with ten degrees of freedom.

SUMMARY OF THE INVENTION

This invention relates to the use of images input to a computer for effectuating computer control. The present invention provides a system and method for tracking the three-dimensional position and orientation of two fingers of the user's hand with five degrees of freedom for each finger for a total of ten degrees of freedom. The tracking of the user's fingers by the inventive system enables the user to utilize and control computer applications requiring three-dimensional interaction, and in particular three-dimensional object manipulation.

The system includes a computer for controlling operation of the system, having image processing capabilities and a display for displaying a virtual environment to a user, and at least two video input devices, such as video cameras, connected to the computer for acquiring video images and for enabling the computer to operatively identify, interpret, and track motions and gestures of a user's hand made by the user within an identification zone monitored by the video input devices (hereinafter "cameras"). The identification zone is an area, typically, but not necessarily, near the computer system, towards which the first and second cameras are oriented. The configuration and functionality of the cameras and the computer are similar to the above-incorporated Segen system except that, inter alia, while the Segen system employs only a single camera, the system of the present invention utilizes two or more cameras to achieve additional and improved functions.

During operation of the inventive system, hand images from the cameras are continually converted to a digital format and input to the computer for processing. As in the Segen system, the results of the processing and attempted recognition of each image are then sent to an application or the like for performing various functions or operations. When the inventive computer recognizes a hand gesture as a "point" gesture with at least one finger extended, the computer locates the largest extended finger and labels it as the index finger and then attempts to locate a second extended finger that is significantly smaller than the index finger. If the second extended finger is located, the computer labels that second finger as the thumb. If at least the index finger is located, the computer uses information derived from the images to track three-dimensional coordinates of the index finger and the thumb (if located) with five degrees of freedom for each finger.

Essentially, the computer utilizes two-dimensional images obtained by each camera to derive three-dimensional position (in an x, y, z coordinate system) and orientation (azimuth and elevation angles) coordinates of the extended index finger and thumb. This feature is not possible in the Segen system because at least two cameras are necessary (using triangulation) to generate the information required for three-dimensional position and orientation tracking. Thus, the present invention provides an advantageous supplement to the functionality of the Segen system because, in addition to issuing commands to a computer using hand gestures (as described in detail in Segen), the inventive system enables the user to control applications which require three-dimensional interaction and three-dimensional object manipulation.

The inventive method of tracking three-dimensional coordinates of the user's extended fingers with five degrees of freedom for each finger is performed as follows. Initially, the two cameras are calibrated to derive a perspective projection matrix for each camera. The computer then simultaneously acquires a first image of the user's hand from the first camera and a second image of the user's hand from the second camera. Next, a region extraction step is conducted for each image. The region extraction step defines a set of regions containing or possibly containing an image of the hand in a video frame of each acquired image. The set of regions in each of the two images is then processed by the computer in a screening step which detects and selects one of the defined regions of each image as a hand image, i.e. identifies one of the regions in an image as a hand. If a hand image is thereby identified in each of the two images, then the set of localized features of the hand image in each of the two images is computed from the boundary of the respective selected hand regions. The boundary of each hand region is thereafter analyzed to correlate, for each hand image, the boundary data with one of a stored plurality of hand gestures and to thereby classify each of the hand gestures as belonging to a particular predefined class. Once the class of each hand image is identified, the computer determines whether both hand images belong to the "point" class (where at least one of the user's fingers is extended). If both images belong to the "point" class, the computer identifies a portion of each hand image corresponding to the user's extended finger or fingers, such as the index finger and the thumb. If the thumb is not located during the first identification attempt, the computer performs a high resolution search for the thumb. The computer then determines pixel coordinates of the "tip" of the index finger and the orientation angle of the index finger's axis for each of the two images, and also performs a similar procedure for the thumb (if located).

Next, the computer performs the following set of operations for each located extended finger (i.e. index finger and/or thumb). The computer first generates parameters for a first virtual line from the first image pixel coordinates of the tip of the extended finger and camera perspective projection matrix, and similarly generates parameters for a second virtual line from the second image pixel coordinates and its perspective projection matrix. The computer then determines the three-dimensional coordinates of the tip of the extended finger by locating a "virtual intersection" of the first and second virtual lines that corresponds to the finger-tip's three-dimensional position. By "virtual intersection" we mean a point in three-dimensional space that is equally distant and nearest to the first and second virtual lines. Thus, the computer tracks the three-dimensional coordinates of the tip of the user's extended finger by generating parameters of the first and second virtual lines and determining, for each first and second image frame, the coordinates of the virtual intersection.

To determine the three-dimensional orientation of the extended finger, i.e., the azimuth and elevation angles, the computer generates, for the first image, a first parameter vector representative of a first three-dimensional virtual plane containing the axis of the extended finger as viewed from the position of the first camera, and also generates, for the second image, a second parameter vector representative of a second three-dimensional virtual plane containing the axis of the extended finger as viewed from the position of the second camera. The computer then determines a third virtual line corresponding to a line formed by intersection of the first and second virtual planes. Finally, the computer derives the azimuth and elevation angles of the extended finger from the parameters of the third virtual line. Thus, the computer tracks the three-dimensional orientation of the user's extended finger by determining, for each first and second image frame, the parameters of the third virtual line formed by the intersection of the first and second virtual planes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE CURRENTLY PREFERRED EMBODIMENTS

Figure 1:
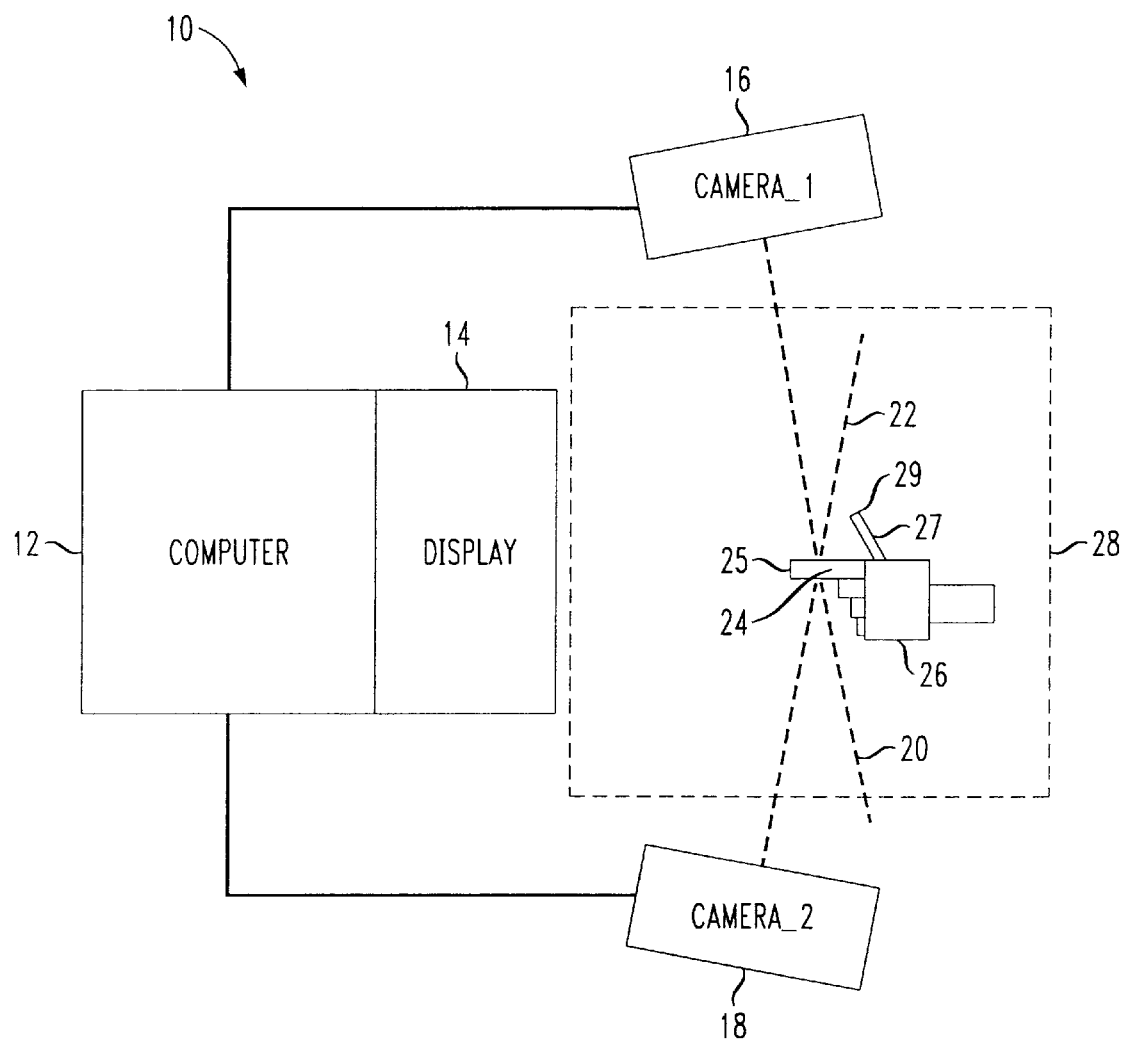
FIG. 1 is a block diagram of a video hand image three-dimensional computer interface system in accordance with the present invention.

Referring now to the drawings, and initially to FIG. 1 thereof, a video gesture-based three-dimensional interface system 10 is there shown. The system 10 is formed of or includes a computer 12, such as a personal computer or a workstation, for controlling the system's operation, a display unit 14, such as a display monitor, for displaying a three-dimensional environment to a user, and a pair of video acquisition devices, such as cameras 16 and 18, connected to computer 12 for monitoring a predefined identification zone 28 to enable the computer 10 to identify hand gestures and movements made by a user's hand 26, index finger 24, index fingertip 25, thumb 27, and thumb fingertip 29 within the identification zone 28 and for converting the hand gestures and hand movements to digital signals that are preferably interpreted as various commands. A lens axis 20 is representative of the orientation of the camera 16; similarly, a lens axis 22 is representative of the orientation of the camera 18. The cameras 16 and 18 are preferably synchronized to work in unison so that, at any given time, the images from all of the cameras correspond to the same scene.

While the system 10 is described herein with specific reference to a pair of cameras 16 and 18 connected to the computer 10, it should be understood that three or more cameras may be connected to the computer 10 and oriented to observe the user's hand 26 within the identification zone 28 without departing from the spirit of the invention. Preferably, the identification zone 28 is defined in an area proximate to the user and the display unit 14 so that the user may comfortably observe the display unit 14 while making desired hand gestures and movements within the zone 28. Furthermore, while the system 10 is described herein with specific reference to the user's hand 26, index finger 24, index fingertip 25, thumb 27, and thumb fingertip 29, it should be understood that another elongated object with two extended tips may be used as a substitute for the user's hand 26, index finger 24, and thumb 27 without departing from the spirit of the invention.

The operation of the system 10 is generally controlled by a control program stored in the a memory (not shown) of the computer 12 and executed by the computer 12. This control program typically consists of multiple integrated program modules, with each module bearing responsibility for controlling one or more functions of the system 10. For example, one program module may identify a hand gesture in an image frame, while another module may control determination of pixel coordinates of a finger 24 of the user's hand 26. In effect, each program module is a control program dedicated to a specific function or set of functions of the system 10.

Figure 2:
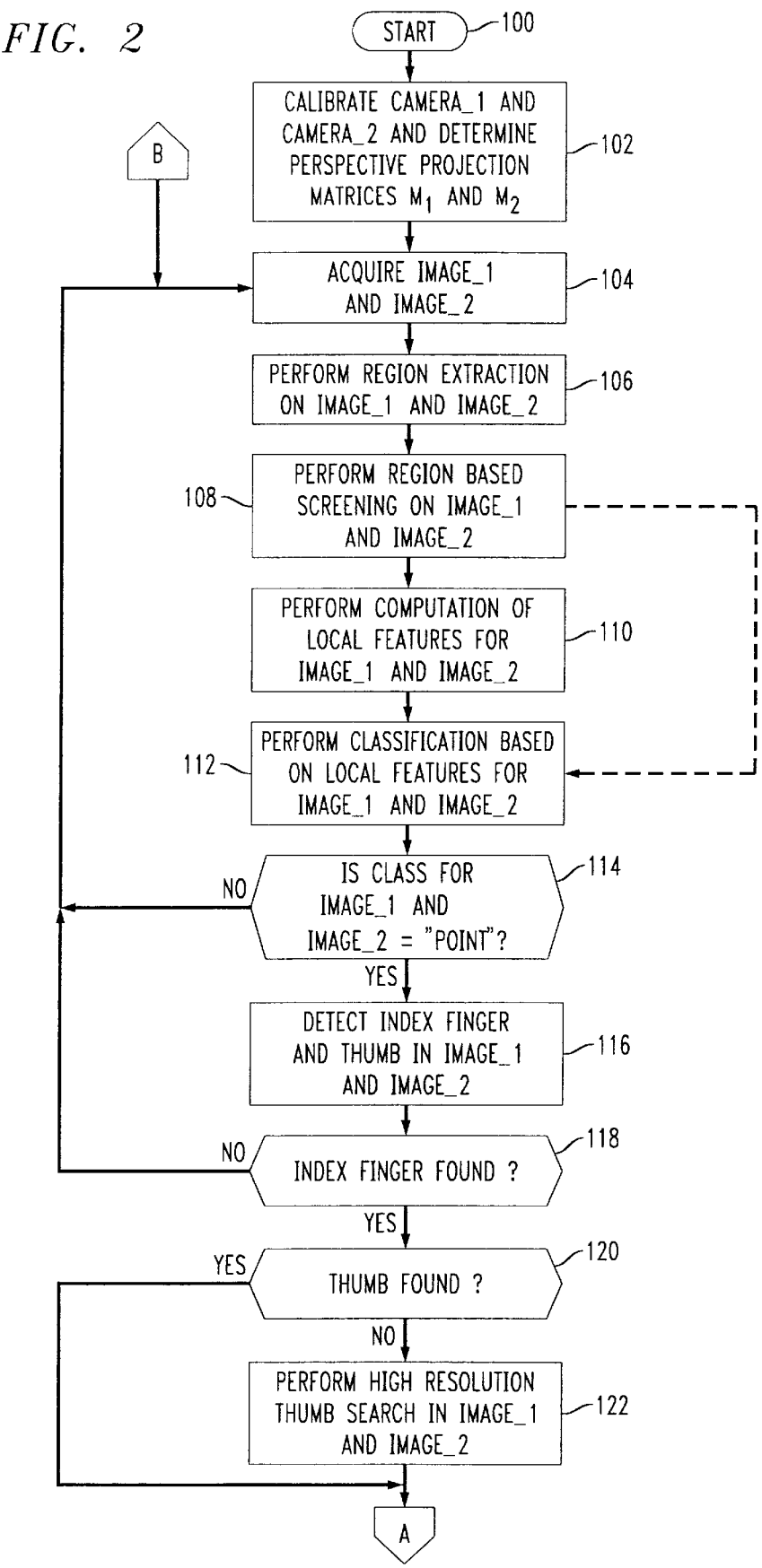
FIGS. 2 and 3 are logic flow diagrams of a three-dimensional position and orientation tracking control program executed by the computer of the system of FIG. 1, in accordance with the principles of the present invention.
Figure 3:
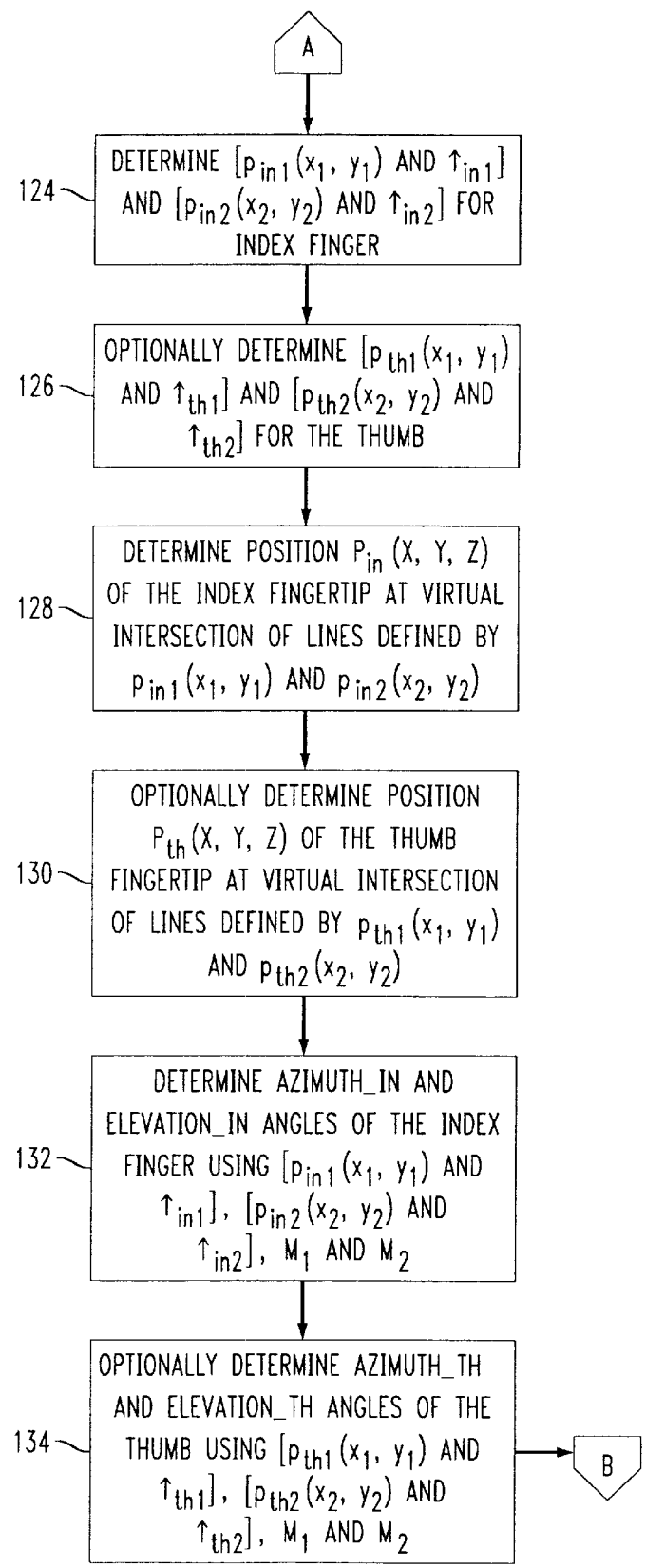

FIGS. 2 and 3 depict a logic flow diagram representing the control program, executed by the computer 12 of FIG. 1 in accordance with the present invention, for controlling the identification and interpretation of the user's hand gestures and for tracking three-dimensional position and orientation coordinates of the index finger 24 and thumb 27 of the user's hand 26 with five degrees of freedom for each finger. Preferably, the control program is executed in conjunction with a Segen system program module that correlates a predetermined hand gesture to the identified hand image for effectuating a particular computer operation or function. Thus, in effect the present invention incorporates the most important feature of the Segen system, i.e. the correlation of a hand image to a hand gesture and effectuation of a computer command associated with the gesture, in addition to the advantageous features of the present invention described below in connection with FIG. 2. The correlation program module is not shown herein, but is described in detail in the above-incorporated co-pending Segen application.

The computer 12 first initializes the system 10 at a step 100 and then proceeds to a step 102 where the cameras 16 and 18 are calibrated to determine perspective projection matrices $M_1$ and $M_2$, respectively. The matrices $M_1$ and $M_2$ are used by the computer 12 to compensate for any differences between internal parameters and external parameters of the respective cameras 16 and 18. Camera calibration is a complex task that may be performed in accordance with one of a variety of well known calibration approaches. However, it would be helpful to describe a preferred approach below. The image of a scene observed by a camera is generated in accordance with two types of parameters called internal parameters and external parameters. Internal parameters include the focal length of the camera lens, the distance between the pixels, size of each pixel and lens distortion coefficients. External parameters include the camera's position and orientation relative to the scene observed by the camera or with respect to a user-defined "real world" coordinate system. These parameters determine the image pixel coordinates (x, y) in a camera image plane, a pixel representation of the scene observed by the camera, that correspond to a three-dimensional point (X, Y, Z) in the real world coordinate system.

Figure 4:
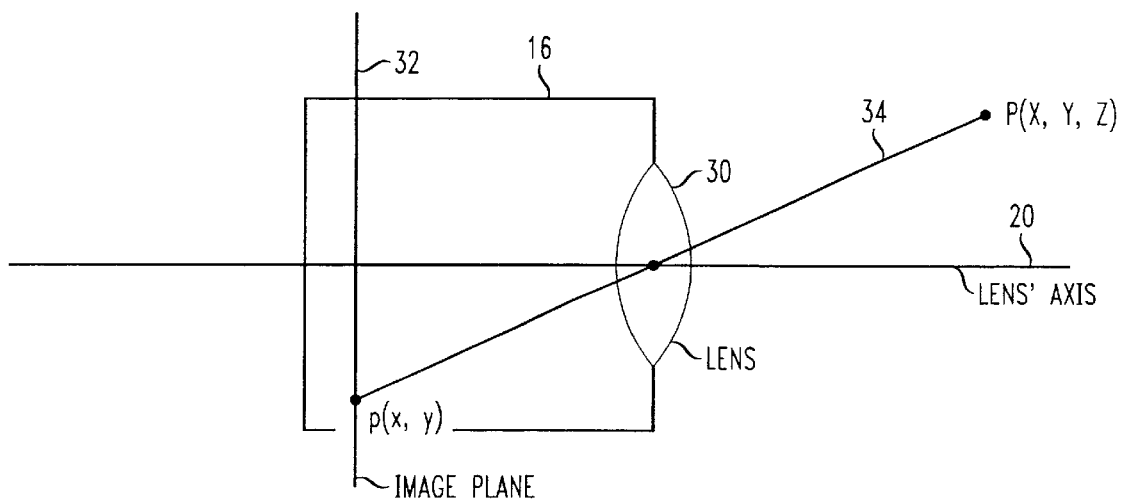
FIG. 4 is a diagram of a relationship between a pixel position in an image plane and a point in real space with respect to a lens of a camera of the computer interface system of FIG. 1.

This arrangement is illustrated in FIG. 4 in perspective projection form for the camera 16. Light bouncing off of a three-dimensional point P(X, Y, Z) in the real world passes through the center of a camera lens 30 along a line 34 and meets an image plane 32 at pixel location p(x, y) to form the image of point P. A three-dimensional point can potentially lie anywhere along the line 34 and still be imaged at point P. When the internal and external parameters of the camera 16 are known it is possible to trace the line 34 for each image point p(x, y) backwards through the lens 30 center into the 3D world. In other words, for each image point p we can compute the line 34 in the world coordinate system on which the corresponding three-dimensional point P should lie. It should be noted that when using a single camera 16, only the line 34 may be computed—the computer 12 cannot determine the exact position of three-dimensional point P along line 34. In order to determine the exact three-dimensional coordinate position of point P, at least two cameras 16 and 18 are necessary, as described below in connection with FIG. 6.

Calibration of a camera typically involves determining a perspective projection matrix M that encapsulates the camera's internal and external parameters using data derived from a perspective projection arrangement as shown in FIG. 4 and described above. There are several known approaches for determining the matrix M of a camera. A superior approach is shown below as Equation 1.

Mathematically, the matrix M can be derived from the relationship between coordinates of three-dimensional point P (X, Y, Z) and image point p (x, y), which can be expressed as follows:

$$[s^*x, s^*y, s]^T = M^*[X, Y, Z, 1]^T \qquad \text{[Equation. 1]}$$

where M is a 4×4 perspective projection matrix, 's' is a scale parameter and [ . . . ]^T denotes matrix transpose.

Preferably, the computer 12 determines the matrices $M_1$ and $M_2$ for the cameras 16 and 18, respectively, in accordance with Equation 1. Alternately, the camera calibration may be performed using other well-known techniques that do not require determination of matrices $M_1$ and $M_2$.

At a step 104, the computer 12 acquires IMAGE_1 of the user's hand 26 from the current image frame of the camera 16 and IMAGE_2 of the user's hand 26 from the current image frame of camera 18. At a step 106, for each of IMAGE_1 and IMAGE_2 the computer performs a region extraction operation for defining a plurality of regions in the hand 26 image contained in a current frame of each respective image. Each region is encompassed or enclosed or bounded by a boundary of pixels with each region being represented by its respective boundary. The presently preferred technique for defining regions is by calculating the difference or absolute difference between the pixel intensity value I(x, y), and another value B(x, y), and comparing that difference to a threshold constant T. The indices x and y identify the pixel coordinates in a video frame, and B(x, y) may be either a constant or a representation of the intensity at a pixel location obtained from a previous or earlier-in-time received image or image frame. If the difference or absolute difference between pixel pairs is greater than the threshold constant T, then the pixel pair will indicate a boundary pixel to be assigned to a common image region.

Although the difference or absolute difference between pixel intensity values is the presently preferred technique for defining boundaries and corresponding image regions, other techniques may also be used. For example, the regions of an image may be defined according to a color criteria wherein pixel colors are grouped together utilizing their color values. In the alternative, a combination of grouping pixels by color values and by the difference or absolute difference in intensity values may be employed by the computer 12 in the region extraction operation to define the image regions in IMAGE_1 and IMAGE_2.

Once the regions of images in IMAGE_1 and IMAGE_2 are defined, at a step 108 the computer screens the defined regions in IMAGE_1 and IMAGE_2 to determine if one or more of the regions contains or resembles a hand. This is performed for each image by comparing the region boundary lengths to a size range. The size range can be prestored values of hand sizes which are stored in the computer 12. In the alternative, the dimensions of a particular user's hand 26 can be input during a training procedure conducted by the user prior to employment of the system 10. If only one of the extracted region boundary lengths falls within a preset range, e.g. between two fixed or predetermined values $T_1$ and $T_2$—which is usually the case with cameras 16 and 18 focused on a user's hand—then that region is selected and passed on to a step 110. Otherwise (as shown in FIG. 2 by a dashed line), if the boundary length of more than one region in both IMAGE_1 and IMAGE_2 falls within the preset range, then the computer proceeds to a step 112.

At step 110, the computer 12 determines local features of the selected image regions in IMAGE_1 and IMAGE_2. As is known in the art, the boundary of a region can be represented as an ordered list of pixel positions [x(i), y(i)], or [P(i)], where P(i)=x(i), y(i). The local features for the boundary region are computed by measuring the curvature at various points on the boundary. In the preferred embodiment, the curvature is defined as an angle C(i) between two vectors [P(i−k), P(i)] and [P(i), P(i+k)] which are computed for each index (i), where k is a constant. Smoothing of the boundary and curvature sequences, such as by averaging curvature values, may then be performed. The local extreme values in the curvature sequences are next identified for defining maximum curvatures which may, for example, correspond to contours of a hand, of fingers, etc. The extreme values are then grouped into two categories denoted "peaks" and "valleys". Peaks are defined as features having a positive or convex boundary with a value greater than a fixed threshold value PThr. Valleys are defined as features having a negative or concave curvature or boundary with a value less than a fixed threshold value VThr.

In the preferred embodiment, local features are computed in two stages to reduce computer 12 processing demands or computational load. In the first stage, local features are computed on a boundary and sampled by a constant factor of F. Among these features, the features having a curvature greater than a constant SPThr, or less than a constant SVThr, are initially selected. In the second stage, local features are re-computed using the original boundary positions of the features selected in the first stage.

At step 112, the computer 12 classifies the computed local features of IMAGE_1 and IMAGE_2 by evaluating the number of peaks (Npeaks) and the number of valleys (Nvalleys). The result of this classification procedure, which is referred to as "CLASS", is (by way of illustrative example) a categorization of the features in each image into one of four values, namely "point", "reach", "fist", and "ground", corresponding to different predetermined hand gestures for computer control. These values are described in greater detail below:

(1) "point": This class corresponds to a gesture in which the index finger 24 and optionally the thumb 27 of the user's hand 26 are extended while the other fingers are closed.

(2) "reach": This class corresponds to the gesture in which all of the fingers of the hand 26 are stretched out.

(3) "fist": This class corresponds to a gesture in which the hand 26 is closed to form a fist.

(4) "ground": This class covers all other gestures and the case in which the hand 26 is not visible.

CLASS is a function of the number of peaks and number of valleys. By defining the maximum value of Npeaks as "MP", and the maximum number of Nvalleys as "MV", the CLASS function can be defined by a table with (MP+1)* (MV+1) entries. In the preferred embodiment, and continuing to use by way of example four possible values of the CLASS feature, the CLASS function is defined as follows:

If Nvalleys is <3 and Npeaks=1 or Npeaks=2, then CLASS="point"; otherwise

If Npeaks is >2 or Nvalleys>2, then CLASS="reach"; otherwise

If Nvalleys is <4 or Npeaks is =0, then CLASS="fist"; otherwise CLASS="ground".

At test 114, the computer 12 determines if CLASS for both IMAGE_1 and IMAGE_2 is "point". If CLASS is "point" for only one of IMAGE_1 and IMAGE_2, then the computer 12 returns to step 104 to acquire a next set of images IMAGE_1 and IMAGE_2 corresponding to a next image frame in each respective camera 16 and 18. Similarly, if CLASS is not "point" for both IMAGE_1 and IMAGE_2, then the computer also returns to step 104. On the other hand, if CLASS is "point" for both IMAGE_1 and IMAGE_2, the computer 12 proceeds to a step 116.

At step 116, the computer 12 attempts to locate the index finger 24 and the thumb 27 in IMAGE_1 and IMAGE_2. This operation is preferably performed for each image as follows. Given a boundary of length Npoints defined by the number of points in a hand image, a variable CNORM(x) is defined as:

If x+1 is >Npoints, then CNORM(x)=x−Npoints;

if x<0, then CNORM(x)=x+Npoints;

otherwise, CNORM(x)=x.

Using the variable CNORM(x), a local feature representative of the tip of the extended index finger 24 is searched for, among the calculated peaks that were determined at the step 110, as follows:

If only a single peak is found, then the location index of that peak is identified as the index finger 24 and a NULL_1 signal is generated to indicate that a thumb has not been located. Also, the computer 12 locates index IndF representing a local feature closest to the tip 25 of the index finger 24. If, however, two peaks are found (labeled A and B), then the following stages are performed:

Where the user's hand 26 is a right hand, if CNORM(A−B)<Npoints/2 then A is returned as the index finger 24 and B is returned as the thumb 27, i.e. the index or location of the peak A is returned as the index finger 24 and the index or location of the peak B is returned as the thumb 27; otherwise the index or location of peak B is returned as the index finger 24, and the index or location of peak A is returned as the thumb 27. Where the user's hand 26 is a left hand and two peaks (A and B) are detected, then the peak corresponding to the index finger is calculated in accordance with the condition that if CNORM (A−B)<Npoints/2, the location of peak B is returned as the index finger 24 and location of peak A is returned as the thumb 27; otherwise, the location of peak A is returned as the index finger 24 and the location of peak B is returned as the thumb 27. If there is no peak detected or if more than two peaks are detected, then the computer 12 generates a NULL__2 signal indicating that the index finger cannot be detected. The computer 12 then locates index IndF representing a local feature closest to the tip 25 of the index finger 24, and also locates index IndT representing a local feature closest to the tip 29 of the thumb 27.

At a test 118, the computer 12 determines whether the index finger 24 has been located at step 116. If the NULL__2 signal, indicating that an index finger cannot be detected, was generated at step 116, then computer 12 returns to step 104 to acquire a next set of images IMAGE__1 and IMAGE__2 corresponding to a next image frame in each respective camera 16 and 18. If, on the other hand, the index finger 24 has been located at step 116, the computer 12 proceeds to a test 120 where it determines whether the thumb 27 has also been located at step 116. If a NULL__1 signal, indicating that a thumb cannot be detected, was generated at step 116, then computer 12 proceeds to a step 122. If, on the other hand, the index finger 27 has been located at step 116, the computer 12 proceeds to a step 124.

At step 122, the computer 12 performs a high resolution search for the thumb 27 in IMAGE__1 and IMAGE__2. First, the computer 12 increases the sampling factor F by a first predetermined quantity, and lowers the curvature threshold constants SPThr and SVThr by a second predetermined quantity. Then, the computer 12 repeats steps 110 and 112 using the increased sampling frequency and lower curvature thresholds to obtain a new list of "peaks" for IMAGE__1 and IMAGE__2. The computer 12 scans the new list of "peaks" for IMAGE__1 and IMAGE__2 to determine the index I of the index finger 24 in each image that has already been identified at step 116. Having found the index I of the index finger 24 in each image, the computer 12 then scans the remaining "peaks" to determine whether any of the "peaks" are candidates for being the thumb 27. The computer 12 identifies a "peak" in each image as a "potential thumb" if its index T satisfies the following condition:

$$CNORM(I-Z) < Npoints/3$$

where "I" is the index of the index finger 24.

If the computer 12 locates only one potential thumb in each image, then, the potential thumb "peak" is identified as the thumb 27 and Z is returned as its index. If there are two potential thumbs with respective indices Z1 and Z2 in each image, then the following rule is applied by the computer 12:

If CNORM(I−Z1)<CNORM(I−Z2) then return Z2 as the index of the thumb 27; else return Z1 as the index of the thumb 27.

The computer 12 then locates index IndT representing a local feature closest to the tip 29 of the thumb 27. If the computer 12 locates more than two potential thumbs or if it does not locate any potential thumbs, the computer 12 again generates the NULL__1 signal and then proceeds to a step 124.

Figure 5:
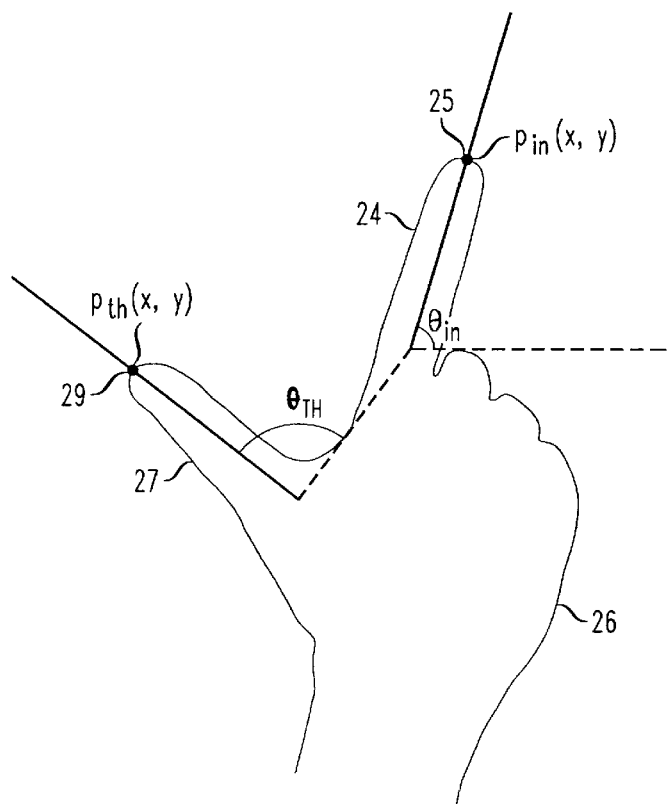
FIG. 5 is a representation of basic three-dimensional coordinates of a user's extended finger.

At step 124, the computer 12 identifies and locates the index fingertip 25 of the index finger 24, by determining a first set of pixel coordinates of the index fingertip 25 $p_{in1}(x_1,y_1)$ and an orientation angle $\vartheta_{in1}$ of the index finger 24 from IMAGE__1, and also determines a second set of pixel coordinates of the index fingertip 25 $p_{in2}(x_2,y_2)$ and an orientation angle $\vartheta_{in2}$ of the index finger 24 from IMAGE__2. A diagram representing exemplary coordinates and orientation angle is shown in FIG. 5. Identification of the index fingertip 25 is important because the user uses the index fingertip 25 to point out and manipulate three-dimensional objects in a computer application requiring three-dimensional interaction. While there are a number of known mathematical approaches for determining pixel coordinates and orientation of objects, an exemplary approach that may be applied to IMAGE__1 and IMAGE__2 to determine pixel coordinates and orientation of the index fingertip 25 in each image is described below for IMAGE__1.

Index IndF determined at step 112 corresponds only approximately to the index fingertip 25 of the index finger 24. Given this approximate position, the computer 12 may locate the position and orientation of the index fingertip 25 more accurately as follows. Using the boundary index IndF of the peak nearest the tip 25 of index finger 24, the computer 12 extracts a list of midpoints [Q(i)] from the boundary using the following expression:

$$Q(i) = \frac{P(CNORM(IndF - V - i)) + P(CNORM(Indf + V + i))}{2}$$

where V is a constant value, and i varies from zero to a constant K. The computer 12 fits a straight line L to the points Q(i), using any line fitting technique known to those having ordinary skill in the art, such for example as a least squares fit calculation. The computer 12 then determines pixel coordinates of the index fingertip 25 at a point $p_{in1} = (x_1,y_1)$ which is nearest to the boundary index IndF where the line L crosses the boundary. The orientation angle $\vartheta_{in1}$ of the index finger 24 is set to the orientation angle of the line L pointing outside the boundary.

The computer 12 then determines whether the NULL__1 signal is present. If the computer 12 does not detect the NULL__1 signal, indicating that the thumb 27 has not been located, then the computer proceeds to a step 126. If the computer 12 detects the NULL__1 signal, then the computer 12 proceeds to a step 128.

At step 126, the computer 12 identifies and locates the thumb fingertip 29 of the thumb 27 by determining a first set of pixel coordinates $p_{th1}(x_1,y_1)$ of the thumb fingertip 29 and an orientation angle $\vartheta_{th1}$ of the thumb 27 from IMAGE__1, and also determines a second set of pixel coordinates $p_{th2}(x_2,y_2)$ of the thumb fingertip 29 and an orientation angle $\vartheta_{th2}$ of the thumb 27 from IMAGE__2. A diagram representing exemplary coordinates and orientation angle is shown in FIG. 5. Identification of the thumb fingertip 29 along with the index fingertip 25 is important because the user may use the index finger and thumb to grasp and otherwise manipulate three-dimensional objects in a computer application requiring three-dimensional interaction. Preferably, the determination of the thumb fingertip pixel coordinates and the thumb orientation angle for each image is performed in a similar manner as described above with respect to the index finger 24 and index fingertip 25.

Figure 6:
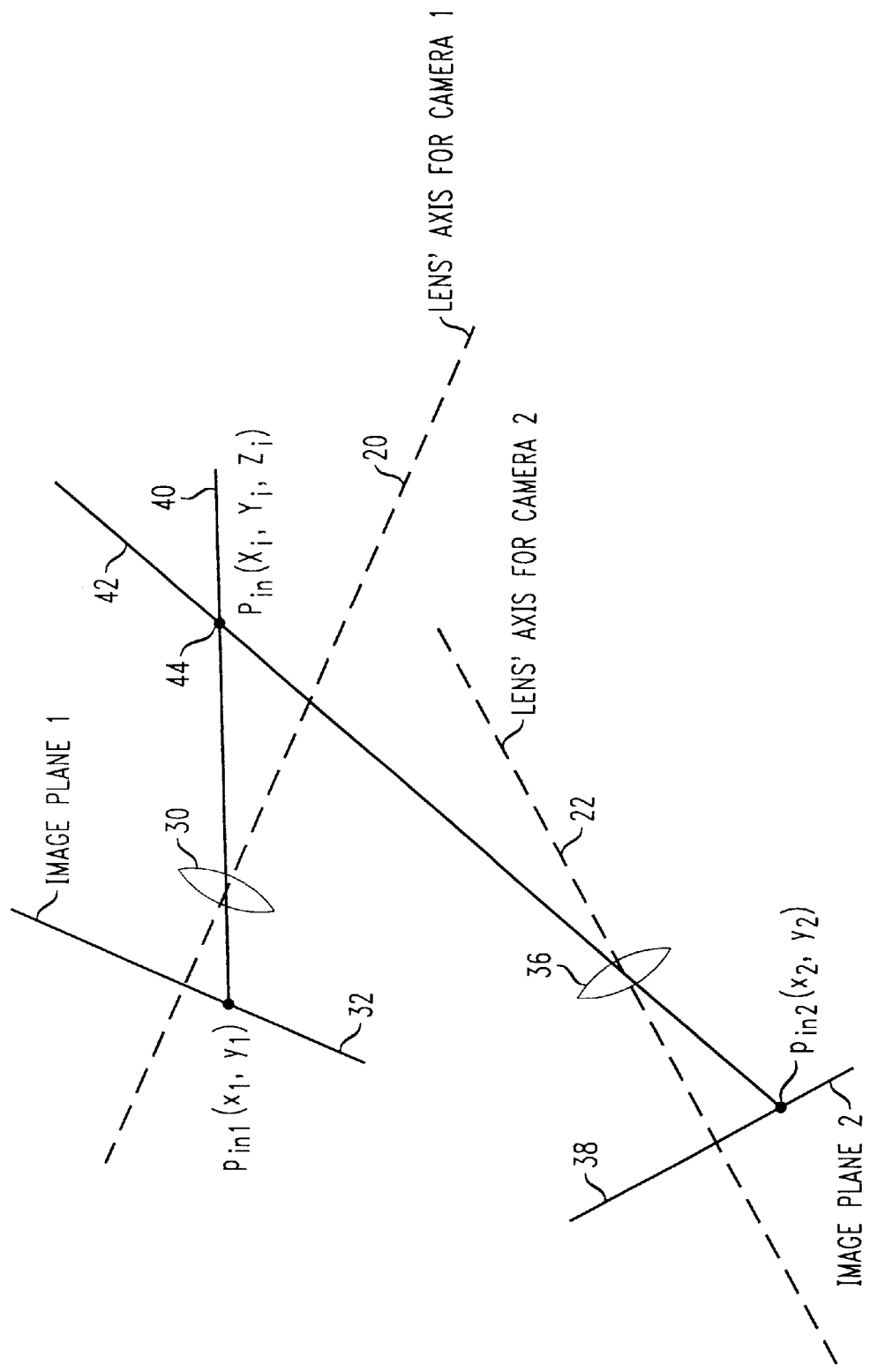
FIG. 6 is a diagram of an image plane and lens axis of each of the lenses of the cameras of the computer interface system of FIG. 1.

Given $p_{in1}(x_1,y_1)$ from IMAGE_1, and $p_{in2}(x_2,y_2)$ of IMAGE_2, the first objective of the computer 12 is to determine $P_{in}(X_i, Y_i, Z_i)$—i.e. the three-dimensional coordinates of a point $P_{in}$ in the real world scene in the identification zone 28 that corresponds to the actual position of the index fingertip 25 in the scene. At step 128, the computer 12 determines $P_{in}(X_i, Y_i, Z_i)$ from the pixel point coordinates $p_{in1}(x_1,y_1)$ and $p_{in2}(x_2,y_2)$ as follows. Referring to FIG. 6, the image plane 32, lens 30, and lens axis 20 of the camera 16 are shown along with an image plane 32, lens 36, and lens axis 22 of the camera 18. The pixel point coordinates $p_{in1}(x_1,y_1)$ and $p_{in2}(x_2,y_2)$ are shown on image planes 32 and 38, respectively. The computer 12 computes a first virtual line 40 using any well-known geometric line equation with parameters corresponding to $p_{in1}(x_1,y_1)$, and similarly generates a second virtual line 42 using parameters corresponding to $p_{in2}(x_2,y_2)$. The computer 12 then determines $P_{in}(X_i, Y_i, Z_i)$ by locating a "virtual intersection" 44 of the virtual lines 40 and 42 that corresponds to the index fingertip 25 three-dimensional position. Thus, the computer 12 continually tracks the three-dimensional coordinates $P_{in}(X_i, Y_i, Z_i)$ of the index fingertip 25 by generating parameters of the virtual lines 40 and 42 and determining, for each image frame of IMAGE_1 and IMAGE_2, the coordinates of the virtual intersection 44.

The computer 12 then determines whether the NULL_1 signal is present. If the computer 12 does not detect the NULL_1 signal, indicating that the thumb 27 has not been located, then the computer proceeds to a step 130. If the computer 12 detects the NULL_1 signal, then the computer 12 proceeds to a step 132.

Given $p_{th1}(x_1,y_1)$ from IMAGE_1, and $p_{th2}(x_2,y_2)$ from IMAGE_2, the second objective of the computer 12 is to determine $P_{th}(X_t, Y_t, Z_t)$—i.e. the three-dimensional coordinates of a point $P_{th}$ in the real world scene in the identification zone 28 that corresponds to the actual position of the thumb fingertip 29 in the scene. At step 130, the computer 12 determines $P_{th}(X_t, Y_t, Z_t)$ from the pixel point coordinates $p_{th1}(x_1,y_1)$ and $p_{th2}(x_2,y_2)$ is a similar manner as is described above in connection with step 128. Thus, the computer 12 continually tracks the three-dimensional coordinates $P_{th}(X_t, Y_t, Z_t)$ of the thumb fingertip 29 by generating the two virtual lines and determining, for each image frame of IMAGE_1 and IMAGE_2, the coordinates of the virtual intersection of the lines.

Given $p_{in1}(x_1,y_1)$, $\vartheta_{in1}$ from IMAGE_1, and $p_{in2}(x_2,y_2)$, $\vartheta_{in2}$ from IMAGE_2, the third objective of the computer 12 is to determine AZIMUTH_IN and ELEVATION_IN angles of the index finger 24, that together with the point $P_{in}$ coordinates $(X_i, Y_i, Z_i)$ enable the system 10 to track the user's hand 26 and index finger 24 with five degrees of freedom. At a step 132 the computer 12 determines a first parameter vector representative of a first three-dimensional virtual plane defined along a first projected axis of the index finger 24 derived by the computer 12 from IMAGE_1, and also generates a second parameter vector representative of a second three-dimensional virtual plane defined along a second projected axis of the index finger 24 derived by the computer 12 from IMAGE_2. The computer 12 then determines an intersection line corresponding to a line formed by intersection of the first and second virtual planes. The computer 12 then derives AZIMUTH_IN and ELEVATION_IN angles of the index finger 24 from parameters of the intersection line using a set of any well-known trigonometric angle determination expressions. Thus, the computer 12 continually tracks the three-dimensional orientation (AZIMUTH_IN and ELEVATION_IN angles) of the index finger 24 by generating parameters of the first and second virtual planes and determining, for each image frame of IMAGE_1 and IMAGE_2, the parameters of the intersection line formed by the intersection of the first and second virtual planes.

While there are a number of well known mathematical approaches for determining the above-described first and second parameter vectors, from $P_{in1}(x_1,y_1)$, $\vartheta_{in1}$, and $p_{in2}(x_2,y_2)$, $\vartheta_{in2}$, respectively, an exemplary approach is illustrated below.

A line in a two dimensional plane can be represented by the equation $$a*x + b*y + c = 0 \qquad \text{[Equation 2]}$$

where (x, y) is an arbitrary point on the line and where a, b and c denote the parameters of the line. Equation 2 can be expressed in matrix notation as $$v\hat{}T*u = 0 \qquad \text{[Equation 3]}$$

where $v=[x, y, 1]\hat{}T$ and $u=[a, b, c]\hat{}T$. The vector u denotes the parameters of the line and $[\ldots]\hat{}T$ denotes matrix transpose.

Similarly, a three-dimensional plane may be represented by the equation $$a'*x + b'*y + c'*z + d' = 0 \qquad \text{[Equation 4]}$$

where (x, y, z) is an arbitrary point on the three-dimensional plane and where a', b', c', and d' denote the parameters of the plane. In a matrix notation, the above equation becomes $$v'\hat{}T*u' = 0 \qquad \text{[Equation 5]}$$

where $v'=[x, y, z, 1]\hat{}T$ and $u'=[a', b', c', d']\hat{}T$. The vector u' denotes the parameters of the line.

Given an image $p_{in1}(x_1,y_1)$, of the index fingertip 25 and its orientation ($\vartheta_{in1}$) in IMAGE_1, an image line representing the projected axis of the finger 24, as it appears in IMAGE_1, has the parameters given by:

$$a = \cos(\vartheta_{in1}), \quad b = -\sin(\vartheta_{in1})$$

and $$c = y_1 * \sin(\vartheta_{in1}) - x_1 * \cos(\vartheta_{in1}). \qquad \text{[Equation 6]}$$

Hence, in accordance with Equation 3, the projected axis may be expressed as follows:

$$v\hat{}T*u = 0 \qquad \text{[Equation 7]}$$

where $v=[x, y, 1]\hat{}T$, $u=[\cos(\vartheta_{in1}), -\sin(\vartheta_{in1}), y_1*\sin(\vartheta_{in1}) - x_1*\cos(\vartheta_{in1})]$ and where (x, y) is an arbitrary point on the projected axis.

Multiplying both sides of Equation 7 by a scale factor "s", the equation may be re-written as:

$$w\hat{}T*u = 0 \qquad \text{[Equation 8]}$$

where $w=[s*x, s*y, S]\hat{}T$.

An arbitrary three-dimensional point (X, Y, Z) along the projection axis in the real world coordinate system is then selected. The relationship between the "real-world" point (X, Y, Z) and the image point p(x, y) is shown in Equation 1. Equation 1 may be rewritten in a matrix notation as:

$$w = M_1 * W \qquad \text{[Equation 9]}$$

where $w=[s*x, s*y, s]\hat{}T$, $W=[X, Y, Z, 1]$ and $M_1$ is the projection matrix determined at step 102 for camera 16.

Since point p(x, y) lies on the projection axis of index finger 24, it satisfies Equation 8. Combining Equations 8 and 9, the following equation is formed:

$$W^{\wedge}T^{*}M1^{\wedge}T^{*}u=0 \qquad \text{[Equation 10]}$$

Comparing Equation 10 with Equation 4, the first parameter vector for the first three-dimensional virtual plane containing the projection axis of the index finger 24 from IMAGE_1 may be determined as:

$$u'=M1^{\wedge}T^{*}u \qquad \text{[Equation 11]}$$

The above-described procedure is then performed using $p_{in2}(x_2,y_2)$, $\vartheta_{in2}$ to similarly determine the second parameter vector for the second three-dimensional virtual plane.

The computer 12 then determines whether the NULL_1 signal is present. If the computer 12 does not detect the NULL_1 signal, indicating that the thumb 27 has not been located, then the computer returns to step 104. If the computer 12 detects the NULL_1 signal, then the computer 12 proceeds to a step 134.

Given $p_{th1}(x_1,y_1)$, $\vartheta_{th1}$ from IMAGE_1, and $p_{th2}(x_2, y_2)$, $\vartheta_{th2}$ from IMAGE_2, the fourth and final objective of the computer 12 is to determine AZIMUTH_TH and ELEVATION_TH angles of the thumb 27, that together with the point $P_{th}$ coordinates $(X_t, Y_t, Z_t)$ enable the system 10 to track the user's hand 26 and thumb 27 with five degrees of freedom for a total of ten degrees of freedom (five degrees for the index finger 24 and five degrees for the thumb 27). At step 134 the computer 12 determines a third parameter vector representative of a third three-dimensional virtual plane defined along a third projected axis of thumb 27 derived by computer 12 from IMAGE_1, and also generates a fourth parameter vector representative of a fourth three-dimensional virtual plane defined along a fourth projected axis of thumb 27 derived by computer 12 from IMAGE_2. The computer 12 then determines a second intersection line corresponding to a line formed by intersection of the third and fourth virtual planes. The computer 12 then derives AZIMUTH_TH and ELEVATION_TH angles of the thumb 27 from parameters of the second intersection line using a set of any well-known trigonometric angle determination expressions (for example as described above in connection with step 132). Thus, the computer 12 continually tracks the three-dimensional orientation (AZIMUTH_TH and ELEVATION_TH angles) of the thumb 27 by generating the parameters of third and fourth virtual planes and determining, for each image frame of IMAGE_1 and IMAGE_2, the parameters of the second intersection line formed by the intersection of the third and fourth virtual planes.

The computer 12 then returns to step 104 where a next set of image frames of IMAGE_1 and IMAGE_2 is acquired.

Thus, while there have shown and described and pointed out fundamental novel features of the invention as applied to preferred embodiments thereof, it will be understood that various omissions and substitutions and changes in the form and details of the methods described devices illustrated, and in their operation, may be made by those skilled in the art without departing from the spirit of the invention. For example, although the preferred embodiment employs images of a hand to effectuate computer control, images of other objects may, likewise, be employed—such, for example, as images of a pencil or other pointing-type object—to mark or designate menu entries or features on a computer screen, etc. Accordingly, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of tracking, in a real world scene, three-dimensional position coordinates and orientation angles of a user's hand and of the user's extended index finger having a first axis and of an extended thumb having a second axis said method being implemented in a computer system having a first video acquisition device and a second video acquisition device for monitoring, from different positions, an identification zone defined in the real world scene, said method comprising the steps of:

(a) acquiring a first image of the user's hand from the first video acquisition device and simultaneously acquiring a second image of the user's hand from the second video acquisition device when the user's hand is disposed within the identification zone;

(b) analyzing said first and second images to determine whether both said first and second images correspond to a pointing gesture of the user's hand wherein at least the index finger is extended, and (1) when both said first and second images are determined to correspond to the pointing gesture of the user's hand:
       (A) identifying a first end portion of the extended index finger on each of said first and second images; and
       (B) determining whether the thumb is extended, and when the thumb is determined to be extended, identifying a second end portion of the extended thumb on each of said first and second images;
     (2) when only one of said first and second images is determined to correspond to the pointing gesture of the user's hand, repeating said step (a) and then said step (b); and
     (3) when both said first and second images are determined to not correspond to the pointing gesture of the user's hand, repeating said step (a) and then said step (b);

(c) determining a first set of pixel coordinates and a first orientation angle for the first end portion of the extended index finger from said first image and determining a second set of pixel coordinates and a second orientation angle for the first end portion of the extended index finger from said second image;

(d) defining a first virtual line in the real world scene in accordance with said first set of pixel coordinates and said first orientation angle and corresponding to the first axis of the extended index finger as shown in said first image, and defining a second virtual line in the real world scene in accordance with said second set of pixel coordinates and said second orientation angle and corresponding to the second axis of the extended index finger as shown in said second image;

(e) determining the three-dimensional position coordinates of the extended index finger first end portion by identifying coordinates of a first virtual intersection of said first and second virtual lines;

(f) determining a first parameter vector representative of a first linear projection of the index finger first axis in said first image in accordance with said first set of pixel coordinates and said first orientation angle, and determining a second parameter vector representative of a second linear projection of the index finger first axis in said second image in accordance with said second set of pixel coordinates and said second orientation angle;

(g) defining a first virtual plane along said first parameter vector, and defining a second virtual plane along said second parameter vector;

(h) determining the three-dimensional orientation angles of the extended index finger by identifying orientation parameters of a first intersecting line defined by an intersection of said first and said second virtual planes;

(i) when the thumb is determined to be extended at said step (A), determining a third set of pixel coordinates and a third orientation angle for the second end portion of the extended thumb from said first image and determining a fourth set of pixel coordinates and a fourth orientation angle for the second end portion of the extended thumb from said second image;

(j) defining a third virtual line in the real world scene in accordance with said third set of pixel coordinates and said third orientation angle and corresponding to the second axis of the extended thumb as shown in said second image, and defining a fourth virtual line in the real world scene in accordance with said fourth set of pixel coordinates and said fourth orientation angle and corresponding to the second axis of the extended thumb as shown in said second image;

(k) determining the three-dimensional position coordinates of the extended thumb second end portion by identifying coordinates of a second virtual intersection of said third and fourth virtual lines;

(l) determining a third parameter vector representative of a third linear projection of the thumb second axis in said first image in accordance with said third set of pixel coordinates and said third orientation angle, and determining a fourth parameter vector representative of a fourth linear projection of the thumb second axis in said second image in accordance with said fourth set of pixel coordinates and said fourth orientation angle;

(m) defining a third virtual plane along said third parameter vector, and defining a fourth virtual plane along said fourth parameter vector; and (n) determining the three-dimensional orientation angles of the extended thumb by identifying orientation parameters of a second intersecting line defined by an intersection of said third and fourth virtual planes.

2. The method of claim 1, further comprising the step of:

(o) prior to said step (a), calibrating the first and second video acquisition devices.

3. The method of claim 1, wherein said orientation angles comprise azimuth and elevation angles.

4. The method of claim 1, wherein said step (b) further comprises the steps of:

(p) defining a plurality of regions in each of said first and second images, with each defined region being represented by a corresponding boundary of pixels;

(q) screening each of the corresponding boundaries of the defined regions to identify one of said defined regions, in each of said first and second images, containing an image of the user's hand;

(r) locating extreme concave and convex curvature values on the corresponding boundary of said identified one region, in each of said first and second images, and defining said concave curvature values as valleys and said convex curvature values as peaks; and (s) determining a count of the defined peaks and valleys and correlating the count with prestored data representative of said pointing gesture to determine whether both first and second images correspond to said pointing gesture.

5. The method of claim 4, wherein each of the corresponding boundaries has a length, and wherein said step (q) comprises comparing the boundary lengths to a preset range and selecting a boundary having a length within said preset range as the boundary of said identified one region in each of said first and second images.

6. The method of claim 4, wherein said step (s) comprises detecting the index finger in said defined region containing an image of a hand in said first and second images.

7. The method of claim 4, wherein at said step (q) said boundaries are screened at a predefined sampling rate, and wherein at said step (r) said extreme concave and convex curvature values are located by comparing said curvature values to a curvature threshold, further comprising the step of:

(t) when the thumb is determined not to be extended at said step (B), (4) increasing said predefined sampling rate by a first predetermined quantity, (5) lowering said curvature threshold by a second predetermined quantity, and (6) repeating said steps (q) and (r) in accordance with said increased sampling rate and said decreased curvature threshold.

8. A system for tracking, in a real world scene, three-dimensional position coordinates and orientation angles of a user's hand and of the user's extended index finger having a first axis and of an extended thumb having a second axis, said the system comprising:

a first video acquisition device and a second video acquisition device for monitoring, from different positions, an identification zone defined in the real world scene, and a computer connected to said first and second video acquisition devices and operable for:
    acquiring a first image of the user's hand from the first video acquisition device and simultaneously acquiring a second image of the user's hand from the second video acquisition device when the user's hand is disposed within the identification zone;
    analyzing said first and second images to determine whether both said first and second images correspond to a pointing gesture of the user's hand wherein at least the index finger is extended, and
    when both said first and second images are determined to correspond to the pointing gesture of the user's hand:
        identifying a first end portion of the extended index finger on each of said first and second images;
        determining whether the thumb is extended, and when the thumb is determined to be extended, identifying a second end portion of the extended thumb on each of said first and second images;
    when only one of said first and second images is determined to correspond to the pointing gesture of the user's hand, acquiring a first image of the user's hand from the first video acquisition device and simultaneously acquiring a second image of the user's hand from the second video acquisition device; and
    when both said first and second images are determined to not correspond to the pointing gesture of the user's hand, acquiring a first image of the user's hand from the first video acquisition device and simultaneously acquiring a second image of the user's hand from the second video acquisition device;

determining a first set of pixel coordinates and a first orientation angle for the first end portion of the extended index finger from said first image and determining a second set of pixel coordinates and a second orientation angle for the first end portion of the extended index finger from said second image;

defining a first virtual line in the real world scene in accordance with said first set of pixel coordinates and said first orientation angle and corresponding to the first axis of the extended index finger as shown in said first image, and defining a second virtual line in the real world scene in accordance with said second set of pixel coordinates and said second orientation angle and corresponding to the second axis of the extended index finger as shown in said second image;

determining the three-dimensional position coordinates of the extended index finger first end portion by identifying coordinates of a first virtual intersection of said first and second virtual lines;

determining a first parameter vector representative of a first linear projection of the index finger first axis in said first image in accordance with said first set of pixel coordinates and said first orientation angle, and determining a second parameter vector representative of a second linear projection of the index finger first axis in said second image in accordance with said second set of pixel coordinates and said second orientation angle;

defining a first virtual plane along said first parameter vector, and defining a second virtual plane along said second parameter vector;

determining the three-dimensional orientation angles of the extended index finger by identifying orientation parameters of a first intersecting line defined by an intersection of said first and said second virtual planes;

when the thumb is determined to be extended, determining a third set of pixel coordinates and a third orientation angle for the second end portion of the extended thumb from said first image and determining a fourth set of pixel coordinates and a fourth orientation angle for the second end portion of the extended thumb from said second image;

defining a third virtual line in the real world scene in accordance with said third set of pixel coordinates and said third orientation angle and corresponding to the second axis of the extended thumb as shown in said second image, and defining a fourth virtual line in the real world scene in accordance with said fourth set of pixel coordinates and said fourth orientation angle and corresponding to the second axis of the extended thumb as shown in said second image;

determining the three-dimensional position coordinates of the extended thumb second end portion by identifying coordinates of a second virtual intersection of said third and fourth virtual lines;

determining a third parameter vector representative of a third linear projection of the thumb second axis in said second image in accordance with said third set of pixel coordinates and said third orientation angle, and determining a fourth parameter vector representative of a fourth linear projection of the thumb second axis in said second image in accordance with said fourth set of pixel coordinates and said fourth orientation angle;

defining a third virtual plane along said third parameter vector, and defining a fourth virtual plane along said fourth parameter vector; and determining the three-dimensional orientation angles of the extended thumb by identifying orientation parameters of a second intersecting line defined by an intersection of said third and said fourth virtual planes.

9. The system of claim 8, wherein said orientation angles comprise azimuth and elevation angles.

* * * * *